April 27, 1948.  M. W. HUBER  2,440,444

ANTI-FRICTION BEARING

Filed May 6, 1946

*INVENTOR.*
Matthew W. Huber

BY

Attorneys

Patented Apr. 27, 1948

2,440,444

UNITED STATES PATENT OFFICE 2,440,444

ANTIFRICTION BEARING

Matthew W. Huber, Watertown, N. Y., assignor to The New York Air Brake Company, a corporation of New Jersey Application May 6, 1946, Serial No. 667,664

5 Claims. (Cl. 308—230)

This invention relates to a combined thrust and radial anti-friction bearing intended for use where the thrust is heavy. The invention will be described by way of example as embodied in a device making use of a plurality of ball-bearing units arranged in stacked relation.

The invention interposes between successive outer races, and also between successive inner races of a stack of thrust resisting anti-friction bearings, spring washers, preferably dished elastic annuli (hereinafter called "dished washers"), whose resistance to flattening is a function of the maximum thrust, and the number of bearings in the stack. Thus, if there are two stacked bearing units, the dished washer between the two outer races and the dished washer between the two inner races should approach a flattened condition under approximately half the thrust load. If there are three bearings each washer should approach such flattened condition under about one-third the thrust load, and so on.

By the use of spring washers proportioned as aforesaid, good load distribution can be had without undue precision in manufacture. The flattening of a washer of the type contemplated involves motion in an axial direction to the extent of $1/100$ inch or less. The effect in a stack is cumulative, so that as the number of bearing units is increased the motion which must be tolerated (in the absence of preloading) increases. Preloading, when practicable and convenient, serves to take up the motion in question, and its use with the invention is practicable.

A typical embodiment of the invention will now be described by reference to the accompanying drawing, in which.

A base or support for the bearing is illustrated at 6. Closely fitted in a cylindrical recess in base 6 are the outer races 7 and 8 of two combined thrust and radial ball-bearings. The races 7 and 8 are similarly presented and are separated by a dished washer 9.

Figure 1:
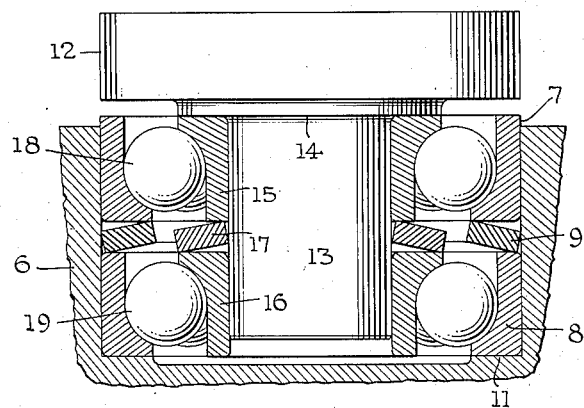
Fig. 1 is an axial section of a two-unit bearing in unloaded condition. In this view the dishing of the dished washers is exaggerated to make it clearly visible.

The races 7 and 8 are of the familiar L-shaped cross section and the washer is so placed that it reacts between areas near the outer margin of the thin section and near the inner margin of the thick section of the proximate portions of the two races, as clearly shown in Fig. 1.

The lower race 8 is supported by an annular seat 11 at the bottom of the recess.

The supported rotary member 12 has a reduced cylindrical extension 13 leading from a shoulder 14. The inner races 15 and 16 (also of L-shaped cross section) fit on extension 13 and are separated by a smaller dished washer 17. The races 15 and 16 are similarly presented and the washer 17 reacts between an area near the inner margin of the thin section of race 15 and an area near the outer margin of the thick section of race 16.

Between races 7 and 15 are the usual bearing balls 18. Similar balls 19 are interposed between the races 8 and 16.

Because of the arrangement of the dished washer relatively to the races the thrust load is most favorably absorbed.

Figure 2:
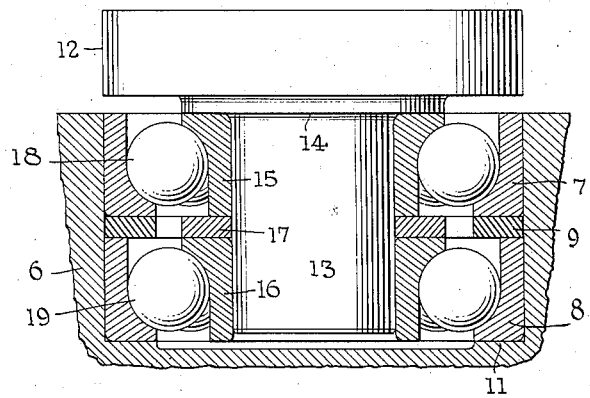
Fig. 2 is a similar view showing the bearing loaded in thrust.
Figure 3:
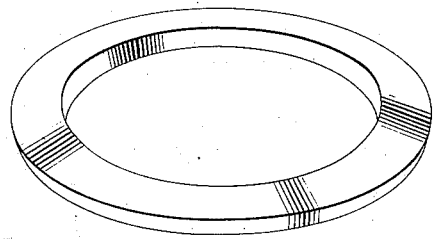
Fig. 3 is a perspective view of a dished washer such as is used for load equalizing purposes. Here also the dishing of the washer is exaggerated.

At maximum thrust loading the parts assume the relative positions shown in Fig. 2. By properly designing the dished washers, it is practicable to divide the thrust load approximately evenly between the two bearings.

While theoretically any elastic washer might be used between races, the dished washer chosen for illustration is outstanding because of maintained elasticity, and the fact that the areas of reaction are continuous and concentric with the races, and can be favorably located as to the loading of the races, as is clearly indicated in Fig. 1.

The invention is not limited to use with two stacked bearings, but the successful use of an increased number requires the use of spring washers of such strength as will assure a satisfactory division of load, according to principles already explained.

What is claimed is:

1. A bearing assembly comprising in combination a plurality of anti-friction radial-and-thrust bearing units, each unit comprising an inner race, an outer race and an interposed series of rolling load transmitting members; thrust imposing means in which the outer races of said bearings are laterally confined in stacked relation, and by which only an end race of the stack is sustained against axial thrust; thrust imposing means upon which the inner races of said bearings are assembled in stacked relation and by which only an end race of the stack is sustained against axial thrust; and elastic means interposed between proximate ends of the inner races and between the proximate ends of the outer races, the form and elastic modulus of said means being so chosen that under the maximum thrust loading for which the assembly is designed the thrust load is approximately equally divided between said bearing units.

2. A bearing assembly comprising in combination a plurality of anti-friction radial-and-thrust bearing units, each unit comprising an inner race, an outer race and an interposed series of rolling load transmitting members; thrust imposing means in which the outer races of said bearings are laterally confined in stacked relation, and by which only an end race of the stack is sustained against axial thrust; thrust imposing means upon which the inner races of said bearings are assembled in stacked relation and by which only an end race of the stack is sustained against axial thrust; and elastic dished washers interposed respectively between the proximate ends of the inner and between the proximate ends of the outer races.

3. The combination defined in claim 2 in which the dished washers are of such form and of such elastic modulus that under the maximum thrust load for which the bearing assembly is designed the thrust is approximately equally divided between the component bearing units.

4. The combination defined in claim 2 in which the dished washers are of such form and of such elastic modulus that under the maximum thrust load for which the bearing assembly is designed the thrust is approximately equally divided between the component bearing units and the washers are substantially completely flattened.

5. The combination defined in claim 2 in which the races are generally L-shaped in radial section and are assembled with the wide annular end portion of one race opposed to the narrow annular end portion of the next race of the stack; and the radial sections of the dished washers are substantially rectangular and approximate in radial dimension the wide annular end portion of the races with which respective washers coact.

MATTHEW W. HUBER.

REFERENCES CITED

The following references are of record in the file of this patent:

UNITED STATES PATENTS

| Number | Name | Date |
|---|---|---|
| 1,232,800 | Hess | July 10, 1917 |